(12) United States Patent
Han

(10) Patent No.: US 10,798,450 B2
(45) Date of Patent: Oct. 6, 2020

(54) DISPLAY APPARATUS AND SET-TOP BOX IDENTIFICATION METHOD THEREOF

(71) Applicant: SAMSUNG ELECTRONICS CO., LTD., Suwon-si (KR)

(72) Inventor: Jeong-ho Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/808,298

(22) Filed: Nov. 9, 2017

(65) Prior Publication Data

US 2018/0131999 A1    May 10, 2018

(30) Foreign Application Priority Data

Nov. 9, 2016 (KR) .................. 10-2016-0148719

(51) Int. Cl.
| | | |
|---|---|---|
| *H04N 21/41* | (2011.01) | |
| *H04N 21/44* | (2011.01) | |
| *H04N 21/45* | (2011.01) | |
| *H04N 21/436* | (2011.01) | |
| *H04N 21/422* | (2011.01) | |
| *H04N 5/44* | (2011.01) | |
| *G08C 17/00* | (2006.01) | |
| *H04L 12/24* | (2006.01) | |

(52) U.S. Cl.
CPC ......... *H04N 21/4516* (2013.01); *G08C 17/00* (2013.01); *H04L 41/0866* (2013.01); *H04N 5/4403* (2013.01); *H04N 21/4108* (2013.01); *H04N 21/42207* (2013.01); *H04N 21/42225* (2013.01); *H04N 21/43615* (2013.01); *G08C 2201/92* (2013.01); *H04N 2005/4407* (2013.01); *H04N 2005/4435* (2013.01)

(58) Field of Classification Search
None
See application file for complete search history.

(56) References Cited

U.S. PATENT DOCUMENTS

| | | | |
|---|---|---|---|
| 5,614,906 A | 3/1997 | Hayes et al. | |
| 8,775,582 B2 | 7/2014 | Miyamoto et al. | |
| 2004/0119894 A1* | 6/2004 | Higgins | H04L 12/2805 348/734 |
| 2004/0249971 A1* | 12/2004 | Klinker | H04L 29/12066 709/239 |
| 2008/0095365 A1* | 4/2008 | Cocchi | H04N 7/163 380/228 |

(Continued)

FOREIGN PATENT DOCUMENTS

| | | |
|---|---|---|
| EP | 0 223 307 A2 | 5/1987 |
| EP | 1 873 734 A2 | 1/2008 |

(Continued)

OTHER PUBLICATIONS

Communication dated Feb. 16, 2018, issued by the European Patent Office in counterpart European application No. 17199769.5.

*Primary Examiner* — Hsiungfei Peng
(74) *Attorney, Agent, or Firm* — Sughrue Mion, PLLC

(57) ABSTRACT

A method of identifying a set-top box connected to a display apparatus, including detecting network connection information, determining an internet service provider using the detected network connection information, and searching a stored set-top box list according to a priority corresponding to the determined internet service provider.

20 Claims, 12 Drawing Sheets

(56) References Cited

U.S. PATENT DOCUMENTS

| | | | |
|---|---|---|---|
| 2008/0124004 A1* | 5/2008 | Suse | G06F 16/58 |
| | | | 382/306 |
| 2009/0292375 A1 | 11/2009 | Thompson et al. | |
| 2009/0302998 A1 | 12/2009 | Trappeniers et al. | |
| 2013/0205330 A1* | 8/2013 | Sinha | G06T 1/0021 |
| | | | 725/28 |
| 2014/0137149 A1* | 5/2014 | Liu | H04N 21/4108 |
| | | | 725/25 |
| 2017/0302340 A1* | 10/2017 | Berlin | H04B 7/04 |

FOREIGN PATENT DOCUMENTS

| | | |
|---|---|---|
| JP | 5542129 B2 | 7/2014 |
| JP | 5668397 B2 | 2/2015 |
| KR | 19960007580 B1 | 6/1996 |
| KR | 100627180 B1 | 9/2006 |
| KR | 10-2006-0110631 A | 10/2006 |
| KR | 101205689 B1 | 11/2012 |
| KR | 1020150035220 A | 4/2015 |

* cited by examiner

FIG. 7

| STB model | ISP | PRIORITY | CONTROL CODE SET | | |
|---|---|---|---|---|---|
| | | | CHANNEL INCREASE | CHANNEL DECREASE | ... |
| STB_A_01 | Company_1 | 1 | 10_01 | 10_02 | ... |
| STB_A_02 | Company_1 | 1 | 11_01 | 11_02 | ... |
| STB_A_03 | Company_1 | 1 | 12_01 | 12_02 | ... |
| STB_A_04 | Company_2 | 2 | 13_01 | 13_02 | ... |
| STB_B_01 | Company_2 | 2 | 21_00 | 21_02 | ... |
| STB_B_02 | Company_2 | 2 | 22_00 | 22_02 | ... |
| STB_C_01 | Company_3 | 0 (3→0) | 31_11 | 31_10 | ... |
| STB_C_02 | Company_3 | 0 (3→0) | 32_11 | 32_10 | ... |
| STB_C_03 | Company_4 | 4 | 33_11 | 33_10 | ... |

| STB model | ISP |
|---|---|
| STB_A_01 | Company_1 |
| STB_A_02 | Company_1 |
| STB_A_03 | Company_1 |
| STB_A_04 | Company_2 |
| STB_B_01 | Company_2 |
| STB_B_02 | Company_2 |
| STB_C_01 | Company_3 |
| STB_C_02 | Company_3 |
| STB_C_03 | Company_4 |

| STB model | ISP | |
|---|---|---|
| STB_C_01 | Company_3 | SEARCH PRIORITY |
| STB_C_02 | Company_3 | |
| STB_A_01 | Company_1 | |
| STB_A_02 | Company_1 | |
| STB_A_03 | Company_1 | |
| STB_A_04 | Company_2 | |
| STB_B_01 | Company_2 | |
| STB_B_02 | Company_2 | |
| STB_C_03 | Company_4 | |

DISPLAY APPARATUS AND SET-TOP BOX IDENTIFICATION METHOD THEREOF

CROSS-REFERENCE TO RELATED APPLICATIONS

This application claims priority from Korean Patent Application No. 10-2016-0148719, filed on Nov. 9, 2016, in the Korean Intellectual Property Office, the disclosure of which is incorporated herein by reference in its entirety.

BACKGROUND

1. Field

Devices and methods consistent with the present disclosure relate to a display apparatus and a set-up box identification method, and more particularly, to a display apparatus capable of reducing a time for searching a control code for a set-top box connected to the display apparatus by using wired or wireless network information, and a set-up box identification method thereof.

2. Description of Related Art

Various electronic apparatuses such as a display apparatus, a set-top box, an audio device, etc., may operate as a system. If each electronic apparatus includes a remote control device, a user must replace the remote control device each time. To solve the problem of inconvenience, an integrated remote control function capable of controlling a set-top box with a remote control of a display apparatus has been developed.

Conventionally, in order to achieve an integrated remote control function, the user directly inputs a service provider and a set-top box model name. However, a technique of automatically identifying a set-top box connected to a display apparatus has been introduced due to the inconvenience caused by confirming and inputting information of a set-top box during an installation process.

In order to automatically identify the set-top box, a method of building a set of control codes used in set-top boxes of various manufacturers as database and transmitting a control code of a random set-top box model to the set-top box to determine whether a desirable operation is performed has been used.

Approximately one to two seconds may be required to send the control code to the set-top box and determine whether the desirable operation is performed. Therefore, it takes much time to determine which set-top box model is connected to the display apparatus when a search priority of the set-top boxes is not effectively organized.

SUMMARY

An aspect of the exemplary embodiments relates to providing a display apparatus capable of reducing a time required for identifying a set-top box by adjusting a search priority of set-top boxes to be retrieved in a database in consideration of external network environment information of the display apparatus, a set-top box identification method thereof, and a non-transitory computer readable recording medium.

According to an aspect of an exemplary embodiment, a method of identifying a set-top box connected to a display apparatus includes detecting network connection information, determining an internet service provider using the detected network connection information, and searching a stored set-top box list according to a priority corresponding to the determined internet service provider.

The searching of the stored set-top box list may include changing a search priority of a set-top box corresponding to the determined internet service provider in the stored set-top box list, and searching the stored set-top box list according to the changed search priority.

The searching of the stored set-top box list may include transmitting a control code corresponding to a set-top box having a highest priority in the stored set-top box list to a remote control device, and determining whether the set-top box connected to the display apparatus performs an operation corresponding to the control code transmitted to the remote control device.

The method may further include transmitting information of the set-top box to a remote control device.

The information of the set-top box may include at least one of a set-top box model name and a control code.

The determining of the internet service provider may include in response to the display apparatus being connected to a network, identifying an Internet Protocol (IP) address of a Domain Name System (DNS) server of the connected network, and determining the internet service provider based on the identified IP address of the DNS server.

The determining of the internet service provider may include in response to the display apparatus being connected to a network, identifying an Internet Protocol (IP) address of a router of the connected network, determining an area where the display apparatus is located based on the identified IP address of the router, and determining the internet service provider based on the determined area.

The determining of the internet service provider may include, in response to the display apparatus being connected to a network, identifying an Internet Protocol (IP) address of the display apparatus connected to the network, determining an area where the display apparatus is located based on the identified IP address of the display apparatus, and determining the internet service provider based on the determined area.

The determining of the internet service provider may include in response to the display apparatus not being connected to a network, searching a neighboring wireless network signal; and determining the internet service provider based on a service set identifier (SSID) of the neighboring wireless network signal.

The determining of the internet service provider based on the SSID may include determining whether the SSID is used by the internet service provider.

According to another aspect of an exemplary embodiment, a display apparatus includes a communicator configured to connect the display apparatus to a network, a memory configured to store a set-top box list including set-top box information, and a processor configured to detect network connection information, determine an internet service provider using detected network connection information, and search the stored set-top box list according to a priority corresponding to the determined internet service provider.

The processor may be further configured to change a search priority of a set-top box corresponding to the determined internet service provider in the stored set-top box list, and searches the set-top box list according to the changed search priority.

The processor may be further configured to control the communicator to transmit a control code corresponding to a set-top box having a highest priority in the set-top box list to a remote control device and determine whether a set-top box connected to the display apparatus performs an operation corresponding to the control code transmitted to the remote control device.

The processor may be further configured to control the communicator to transmit information of a set-top box to a remote control device.

The information of the set-top box may include at least one of a set-top box model name and a control code.

The processor, in response to the display apparatus being connected to the network, may be further configured to identify an Internet Protocol (IP) address of a Domain Name System (DNS) server of the connected network and determine the internet service provider based on the identified IP address of the DNS server.

The processor, in response to the display apparatus being connected to the network, may be further configured to identify an Internet Protocol (IP) address of a router of the connected network, determine an area where the display apparatus is located based on the identified IP address of the router, and determine the internet service provider based on the determined area.

The processor, in response to the display apparatus being connected to the network, may be further configured to identify an Internet Protocol (IP) address of the display apparatus connected to the network, determine an area where the display apparatus is located based on the identified IP address of the display apparatus, and determine the internet service provider based on the determined area.

The processor, in response to the display apparatus not being connected to the network, may be further configured to search a neighboring wireless network signal and determine the internet service provider based on a service set identifier (SSID) of the retrieved wireless network signal.

The processor may be further configured to determine the internet service provider based on whether the SSID is used by the internet service provider.

BRIEF DESCRIPTION OF THE DRAWINGS

FIGS. 7 and 8 are views provided to explain change of a search priority according to an exemplary embodiment.

DETAILED DESCRIPTION OF EXEMPLARY EMBODIMENTS

Figure 1:
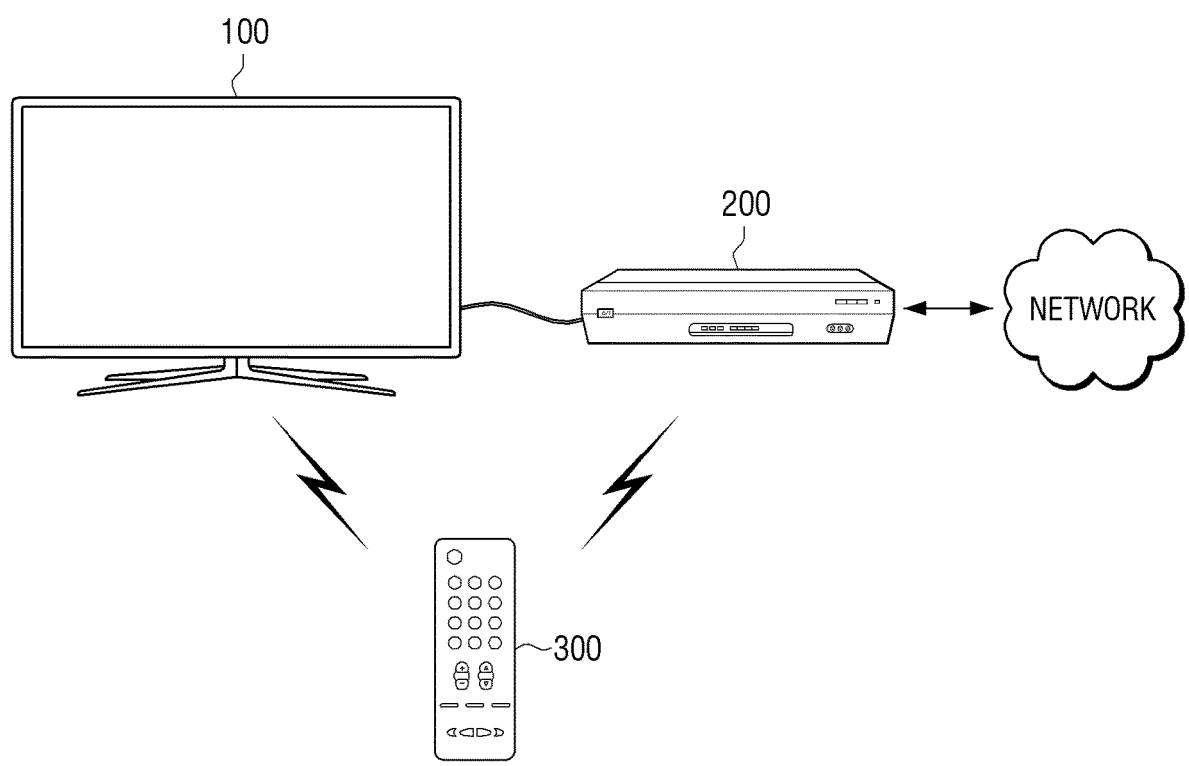
FIG. 1 is a concept view provided to illustrate a display system according to an exemplary embodiment.

Throughout the drawings, like reference numerals will be understood to refer to like parts, components, and structures.

For reference, when it is determined that detailed description of the known function or configuration may obscure the gist of the exemplary embodiments in describing them, the detailed description thereof will be omitted. Among the terms used herein, those that are defined in the dictionaries may be interpreted based on the same or similar definitions that can be understood in the associated technical context, and unless specifically defined otherwise, these are not interpreted as ideal or unnecessarily formal ways. Therefore, the terms used in the exemplary embodiments should be defined based on the meaning thereof and the descriptions of the present disclosure, rather than based on their names only.

Terms such as "first" and "second" used in various exemplary embodiments may modify various elements regardless of an order and/or importance of the corresponding elements, and does not limit the corresponding elements. The terms are used simply to distinguish one element from other elements. For example, the first element may be referred to as the second element and similarly, the second element may be referred to as the first element without going beyond the scope of rights of the present disclosure. The term "and/or" includes combination of a plurality of related item of one of the plurality of related items.

The terms in the present application are used to describe exemplary embodiments and are not intended to restrict and/or limit the present disclosure. Singular forms are intended to include plural forms unless the context clearly indicates otherwise.

It should be understood that terms such as "comprise" or "consist of" as used herein designate presence of characteristics, numbers, steps, operations, elements, components or a combination thereof described herein, and do not foreclose the presence or possibility of addition of one or more other characteristics, numbers, steps, operations, elements, components or a combination thereof.

FIG. 1 is a concept view provided to illustrate a display system 1000 according to an exemplary embodiment. As shown in FIG. 1, the display system 1000 may include a display apparatus 100, a set-top box (STB) 200, a remote control device 300. The display apparatus 100 and the set-top box 200 may be connected to the same access point (AP). That is, the display apparatus 100 and the set-top box 200 may be connected to a network with the same IP address.

The display apparatus 100 may be a smart TV, but the present disclosure is not limited thereto. Examples of the display apparatus 100 may include a projection TV, a monitor, a note book PC, a tablet, etc. The set-top box 200 may receive an image signal, etc. from an external source to be transmitted to the display apparatus 100. For example, the set-top box 200 may provide an IPTV function. The remote control device 300 may typically control the display apparatus 100, but may control the set-top box 200 with an integrated remote control function. For example, the remote control device 300 may receive a control code for controlling the set-top box 200 from the display apparatus 100. It is shown that the remote control device 300 is embodied as a smart remote control, but the present disclosure is not limited thereto. Examples of the remote control device 300 may include a pointing device, a motion recognition device, a voice recognition device, etc.

Figure 2:
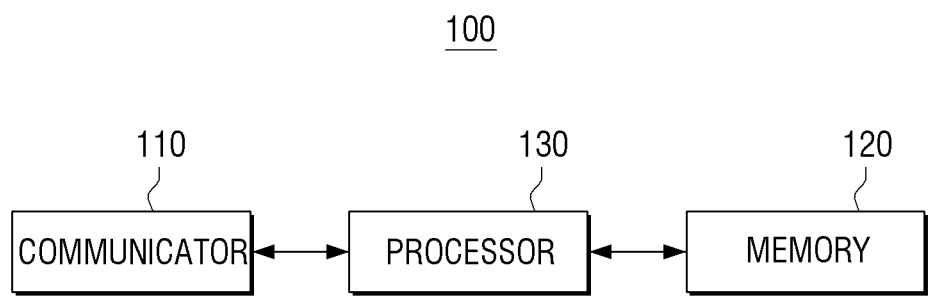
FIG. 2 is a schematic block diagram provided to explain configuration of a display apparatus according to an exemplary embodiment.

FIG. 2 is a schematic block diagram provided to explain configuration of the display apparatus 100 according to an exemplary embodiment. Referring to FIG. 2, the display apparatus 100 may include a communicator 110, a memory 120 and a processor 130.

The communicator 110 may communicate with an external device by using a wired or wireless communication method. In addition, the communicator 110 may be connected to the network such as Internet, Intranet, etc. In addition, the communicator 110 may search a wireless network signal such as WiFi in neighbor of the display apparatus 100.

The memory 120 may include various modules, software and data for driving the display apparatus 100. For example, the memory 120 may store a set-top box list including information of a plurality of set-top boxes. In addition, the memory 120 may store a control code corresponding to each of the set-top boxes for controlling various models of set-top boxes.

The processor 130 may control overall configuration of the display apparatus 100. For example, the processor 130 may set a search priority in the set-top box list by using external environment information, for example wired or wireless network information, regarding a place where the display apparatus 100 is located. The processor 130 may reduce a time for searching a control code for controlling the set-top box 200 actually connected to the display apparatus 100 by setting the search priority by using network information.

According to an exemplary embodiment, the processor 130 may determine an Internet service provider by using the identified network connection information. In addition, the processor 130 may change the search priority of set-top box models used by the Internet service provider determined in the stored set-top box list. The processor 130 may search for the set-top box 200 actually connected to the display apparatus 100 in the set-top box list according to the changed search priority. For example, the processor 130 may control the communicator 110 to transmit a control signal corresponding to each set-top box model to the set-top box 200 connected thereto. The processor 130 may determine which model corresponds to the set-top box 200 connected thereto by confirming whether an operation corresponding to the control signal transmitted from the set-top box 200 is performed.

According to another exemplary embodiment, the processor 130 may transmit a control code of a set-top box model having a highest priority of the set-top box list whose search priority is changed to the remote control device 300, so that the remote control device 300 may transmit and receive the control signal to and from the set-top box 200 connected to the display apparatus 100. When it is confirmed that the set-top box 200 connected to the display apparatus 100 performs the operation corresponding to the control signal, the processor 130 may determine that the set-top box 200 connected to the display apparatus 100 is the same model as a set-top box using a control code currently transmitted.

For example, by using at least one of an IP address of a Domain Name System (DNS) server of the connected network, an IP address of a router of the connected network, and an IP address of the display apparatus 100, the processor 130 may determine where the Internet Service Provider (ISP) or the display apparatus 100 is located. An exemplary embodiment of detailed operation will be described below with reference to drawings.

As another example, when the display apparatus 100 is not connected to the network, the processor 130 may control the communicator 110 to search a wireless network signal in neighbor. In addition, the processor 130 may determine an Internet service provider based on a Service Set Identifier (SSID) of the retrieved wireless network signal. Specifically, the processor 130 may determine an Internet service provider by identifying whether an SSID typically used by an Internet service provider is included in the SSID of the retrieved wireless network signal.

When the set-top box 200 connected to the display apparatus 100 is retrieved, the processor 130 may control the communicator 110 to transmit information of the retrieved set-top box to the remote control device 300. For example, the information of the set-top box transmitted to the remote control device 300 may be a model name or a control code of the set-top box. The remote control device 300 may control the set-top box 200 by using the received control code. Accordingly, the remote control device 300 may function as an integrated remote control capable of controlling both the display apparatus 100 and the set-top box 200.

As described above, the display apparatus 100 according to an exemplary embodiment may reduce a time required for identifying a set-top box, thereby enabling the remote control device 300 to quickly perform an integrated remote control function.

Figure 3:
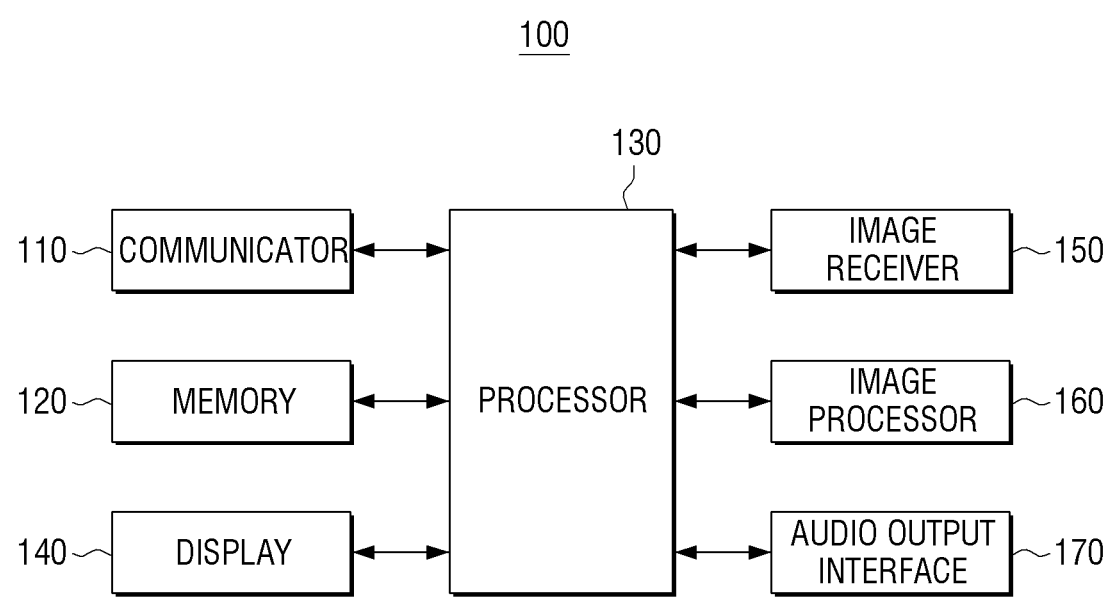
FIG. 3 is a block diagram provided to explain the detailed configuration of the display apparatus according to an exemplary embodiment.

FIG. 3 is a block diagram provided to explain the detailed configuration of the display apparatus 100 according to an exemplary embodiment. Referring to FIG. 3, the display apparatus 100 may include the communicator 110, the memory 120, the processor 130, a display 140, an image receiver 150, an image processor 160 and an audio output interface 170. The configurations of the display apparatus 100 are not limited thereto, but a power, a touch screen, and the like may be further included.

The communicator 110 may perform communication with the external device according to various types of communication methods. The communicator 110 may transmit and receive data and a control signal to or from the set-top box 200 connected by wire or wirelessly. In addition, the communicator 110 may receive an IR signal transmitted from the remote control device 300. The communicator 110 may include various communication chips supporting the wired or wireless communication. For example, the communicator 110 may include a chip which operates by using a method of wire LAN, wireless LAN, WiFi, Bluetooth (BT), or Near Field Communication (NFC). In the case of BT connection, various connection information such as the SSID and a session key may be first transmitted and received to and from the external device, and information including a control command may be transmitted and received after the connection is completed.

The memory 120 may store various programs and data required for an operation of the display apparatus 100. The memory 120 may be embodied as a flash memory, a hard disk, or the like. For example, the memory 120 may include a read-only memory (ROM) for storing a program for performing the operation of the display apparatus 100, a random access memory (RAM) for temporarily storing data according to the operation of the display apparatus 100, and the like. In addition, the memory 120 may further include an Electrically Erasable and Programmable ROM (EEPROM) for storing various reference data.

The memory 120 may store programs and data for forming various screens to be displayed on the display 140. In addition, the memory 120 may store programs and data for performing a specific service. For example, the memory 120 may store the specification information, the control codes, and the Internet service providers respectively corresponding to the model names of the plurality of set-top boxes 200. In addition, the memory 120 may store information on an Internet service provider providing the IPTV service, etc. in a specific area. The memory 120 may include a list of IP addresses of the DNS servers of respective Internet service providers.

The display 140 may display various image contents, information, and user interfaces provided by the display apparatus 100. Specifically, the display 140 may display a user interface screen for selecting image contents provided by the set-top box 200 and image contents to be reproduced. For example, the user interface screen may include a guidance message, a notification message, a function setting menu, a correction setting menu, an operation execution button, and the like. The display 140 may be embodied in various forms such as a Liquid Crystal Display (LCD), an Organic Light Emitting Diode (OLED), an Active Matrix Organic Light-Emitting Diode (AM-OLED), a Plasma Display Panel (PDP), and the like.

The image receiver 150 may receive image contents data through various sources. For example, the image receiver 150 may receive broadcasting data from an external broadcasting station. As another example, the image receiver 150 may receive image data from an external device, for example a set-top box or a DVD player, or stream the image data from an external server.

The image processor 160 may perform image processing on the image data received from the image receiver 150. The image processor 160 may perform various image processing such as decoding, scaling, noise filtering, frame rate conversion and resolution conversion on the image data.

The audio output interface 170 may output various kinds of audio data processed by an audio processing module and various kinds of notification sounds and voice messages.

The processor 130 may control the above-described configurations of the display apparatus 100. For example, the processor 130 may adjust the search priority of the set-top box list by using the network connection information received through the communicator 110. The processor 130 may be a single CPU to perform a control operation, a search operation, and the like, or may be a plurality of processors or an IP which performs a specific function.

Hereinafter, the operation of the processor 130 for identifying a set-top box will be described in more detail with reference to drawings. Generally, a consumer demanding a service using a set-top box such as an IPTV service may use the IPTV service of the same company as the Internet service provider (ISP). This is because an Internet service provider imposes limitations on the IPTV service of another company for a reason of network traffic overload and offers benefits for using the same company's IPTV service. In this regard, it is effective to preferentially search for the set-top box models used by the Internet service provider of the display apparatus 100.

Figure 4:
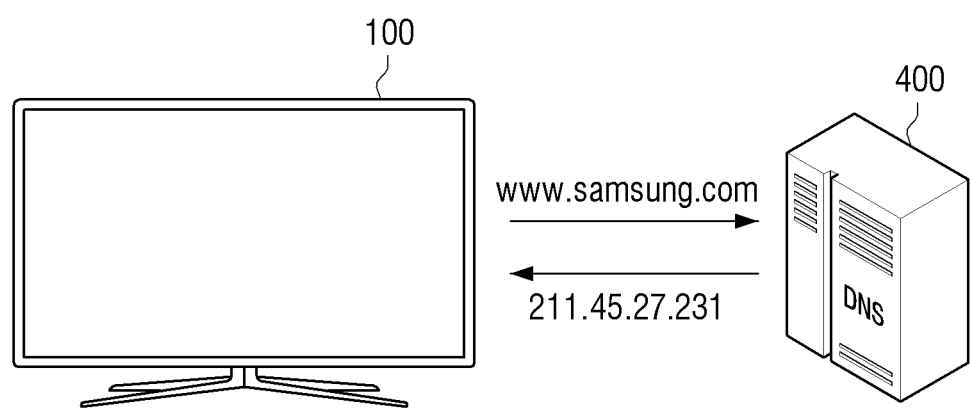
FIG. 4 is view provided to explain a method of using an IP address of a DNS server according to an exemplary embodiment.

FIG. 4 is view provided to explain a method of using an IP address of a DNS server according to an exemplary embodiment. A Domain Name System (DNS) 400 may perform a function converting a domain name of a host into a network address.

As an example of FIG. 4, when the display apparatus 100 transmits a domain name of 'www.samsung.com', the DNS 400 may convert the domain name into an IP address such as '211.45.27.231' and transmit the IP address to the display apparatus 100. Each of the Internet service providers may have a primary DNS server and a secondary DNS server. The IP address of the DNS server of the major Internet service provider may be known to the public.

The display apparatus 100 may be connected to the network by receiving wired or wireless network information. When display apparatus 100 is connected to the network through the communicator 110, the processor 130 may identify the IP address of the DNS server of the connected network. The Internet service provider may operate the DNS server individually and recommend using the DNS server of the Internet service provider for network connection. Accordingly, the processor 130 may determine which Internet service provider's network is connected to the display apparatus 100 by using the IP address of the DNS server of the connected network.

Figure 5:
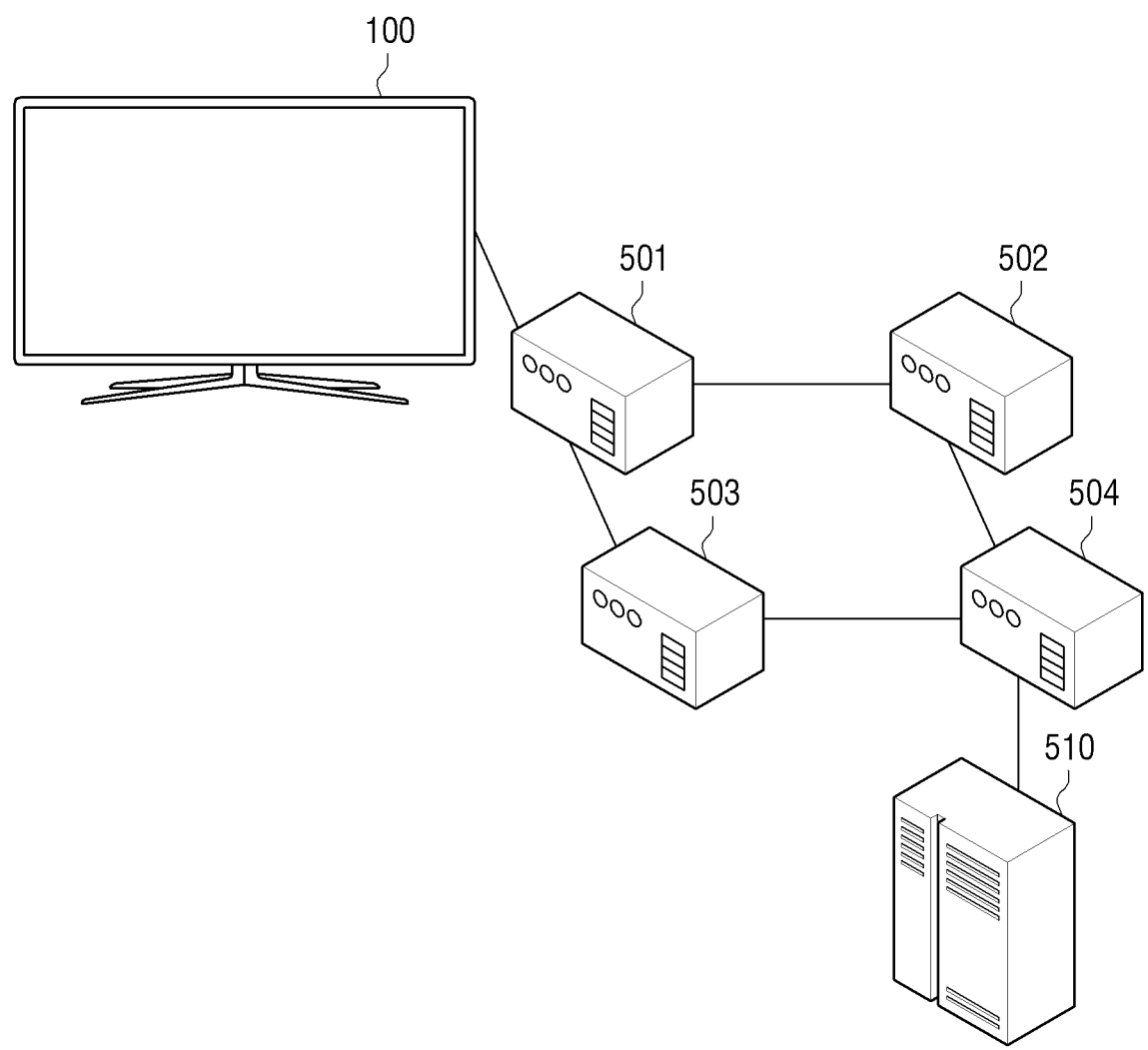
FIG. 5 is a view provided to explain a method of using an IP address of a router according to an exemplary embodiment.

FIG. 5 is a view provided to explain a method of using an IP address of a router according to an exemplary embodiment. The router may connect independent networks to one another. The router may transmit a packet by searching a receiver address of the packet and selecting an optimal route. For example, in FIG. 5, when transmitting the packet to a receiver server 510, a first router 501 may determine which route to choose between a route passing through a second router 502 and a route passing through a third router 503.

Since each of the Internet service providers is connected to an external Internet network via routers serving as specific gateways, the processor 130 may determine which Internet serve provider's network is connected to the display apparatus 100 by using either the IP address of the router or an IP address of a route in a routing process.

In another example, the processor 130 may determine an area where the display apparatus 100 is located by using the IP address of the router or the IP address of the route in the routing process. The market share of the Internet service provider or the IPTV service provider by area may be stored in the memory 120 or may be retrieved through the communicator 110. In this way, the processor 130 may determine which Internet service provider's network is connected to the display apparatus 100 based on the determined area.

According to one exemplary embodiment, the processor 130 may determine an Internet service provider by using the IP address of the display apparatus 100 itself connected to the network. An IP address (Internet Protocol address) may be an identification number for devices in the network to identify and communicate with each other.

The display apparatus 100 may be assigned a fixed IP. The processor 130 may determine an Internet service provider from the IP address of the display apparatus 100 since approximate local information may be obtained by using an IP address.

The display apparatus 100 may be dynamically assigned the IP address. For example, the Internet service provider may assign one of a plurality of specific IP addresses to the display apparatus 100 according to a place where the display apparatus 100 is connected through a Dynamic Host Configuration Protocol (DHCP). Accordingly, even in the case of the dynamically assigned IP address, the processor 130 may determine an Internet service provider in the same manner.

Figure 6:
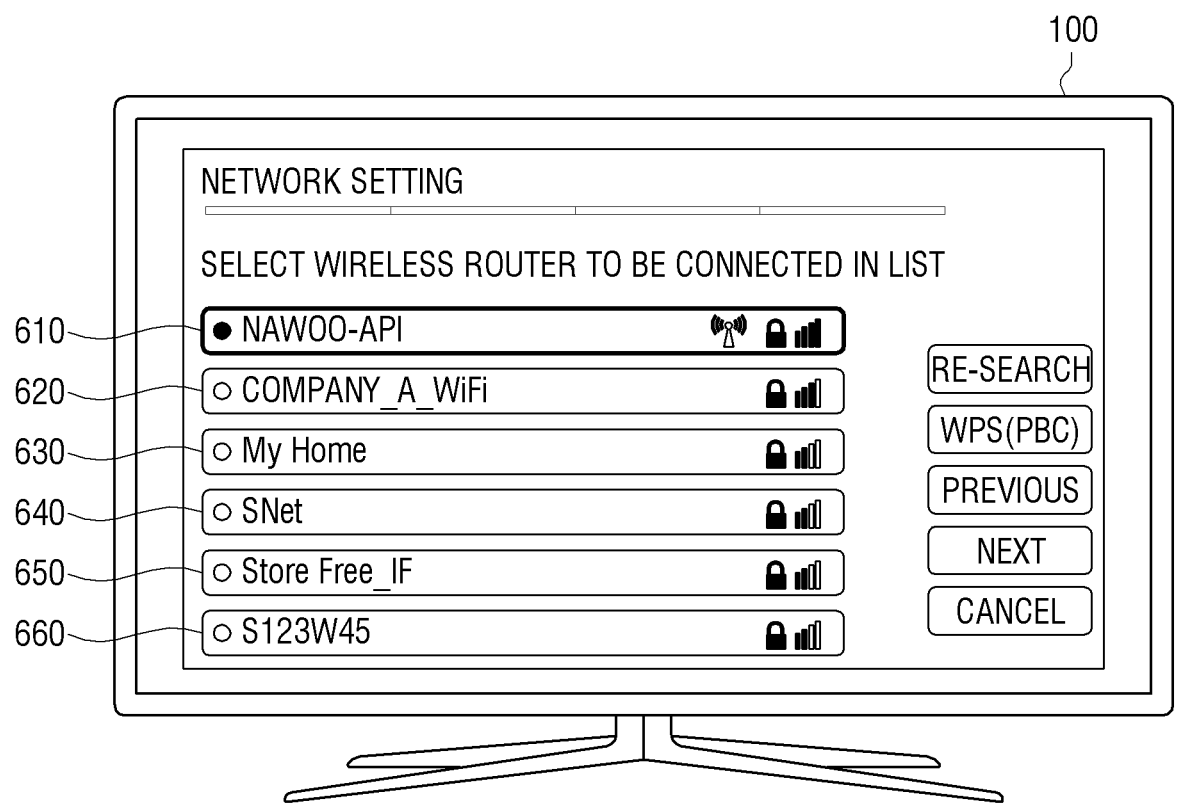
FIG. 6 is a view provided to explain a method of using an SSID according to an exemplary embodiment.

FIG. 6 is a view provided to explain a method of using an SSID according to an exemplary embodiment. According to an exemplary embodiment using the IP address of the DNS server, the IP address of the router, and the IP address of the display apparatus 100, the display apparatus 100 may be connected to the network. When the display apparatus 100 is not connected to the network since the wired or wireless network information is not input, the processor 130 may search a neighboring wireless network signal to determine an Internet service provider.

The SSID (Service Set Identifier) may be a unique identifier attached to headers of packets transmitted through the wireless network. Through the SSID, each wireless network may be distinguished from each other. In FIG. 6, texts of 610 to 660 may be the SSIDs.

Because mobile devices such as smart phones, notebooks, and tablets have been widely used, and the use of wired or wireless routers, which may be routers using wired connections or wireless connections or any combination thereof, is increasing. In the case of using the Internet service and the IPTV service of the same Internet service provider, the Internet service provider may often provide a wired or wireless router. Accordingly, when a default SSID of the wired or wireless router that a specific Internet service provider uses is identified from SSIDs of the wireless network retrieved in the display apparatus 100, there is a high likelihood that the set-top box 200 connected to the display apparatus 100 may be one of the set-top box models used by the Internet service provider.

In this regard, the processor 130 may determine an Internet service provider based on whether the SSID used by the Internet service provider matches the SSID of the retrieved wireless network signal. According to an exemplary embodiment of FIG. 6, the processor 130 may search six wireless networks through the communicator 110 and control the display 140 so that each of SSIDs 610, 620, 630, 640, 650, and 660 is shown in a list. For example, when assuming that an SSID typically used by an Internet service provider 'Company A' is 'COMPANY_A_WiFi', the processor 130 may determine that the Internet service provider is the 'Company A' from the SSID 620 at the second place of an SSID list. In addition, the processor 130 may raise the search priority of the set-top box models used by the 'Company A' in the stored set-top box list.

Figure 8:
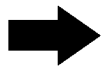

FIGS. 7 and 8 are views provided to explain change of a search priority according to an exemplary embodiment. As shown in the exemplary embodiment of FIG. 7, the set-top box list stored in the memory 120 may include at least one of the set-top box model name, the Internet service provider, the search priority and a control code set. Referring to FIG. 7, the control code exemplifies a channel increase and a channel decrease, but a control code of a volume increase and a volume decrease may also be used.

The processor 130 may determine an Internet service provider by using at least one of the IP address of the DNS server, the IP address of the router, the IP address of the display apparatus 100, and the SSID of the neighboring wireless network.

In the example of FIG. 7, the processor 130 may determine Company_3 as the Internet service provider. The processor 130 may change of a search priority of STB_C_01 and STB_C_02, which are set-top boxes regarding the Internet service provider determined in the set-top box list.

As shown in FIG. 8, the processor 130 may change the search priority of the set-top box list. When assuming that the model name of the set-top box 200 actually connected to the display apparatus 100 is STB_C_02, the processor 130 may identify the set-top box 200 actually connected to the display apparatus 100 by trying a small number of times, for example two times, compared with the case of using the existing set-top box list, for example eight times.

The processor 130 may identify a set-top box by sequentially using the control code according to the search priority of the set-top box list. The processor 130 may transmit the control code of the set-top box model having the highest search priority in the set-top box list to the set-top box 200. As an another example, the processor 130 may transmit the control code of the set-top box model having the highest search priority in the set-top box list to the remote control device 300 in order to transmit the control code to the set-top box 200 connected to the remote control device 300.

When the set-top box 200 connected to the remote control device 300 performs an operation corresponding to the transmitted control code, the processor 130 may determine that the set-top box 200 connected to the remote control device 300 is the same model as a set-top box using the transmitted control code. When the set-top box 200 connected to the remote control device 300 does not perform the operation corresponding to the transmitted control code, the processor 130 may use a control code of a set-top box of the subsequent search priority in the set-top box list and repeat an identification process.

According to various exemplary embodiment, the processor 130 may transmit the control code of the set-top box 200, which is connected, to the remote control device 300 more quickly due to the reduced number of identification process performances required for identifying the set-top box 200. The remote control device 300 receiving the control code may function as an integrated remote control, which controls both the display apparatus 100 and the set-top box 200.

Figure 9:
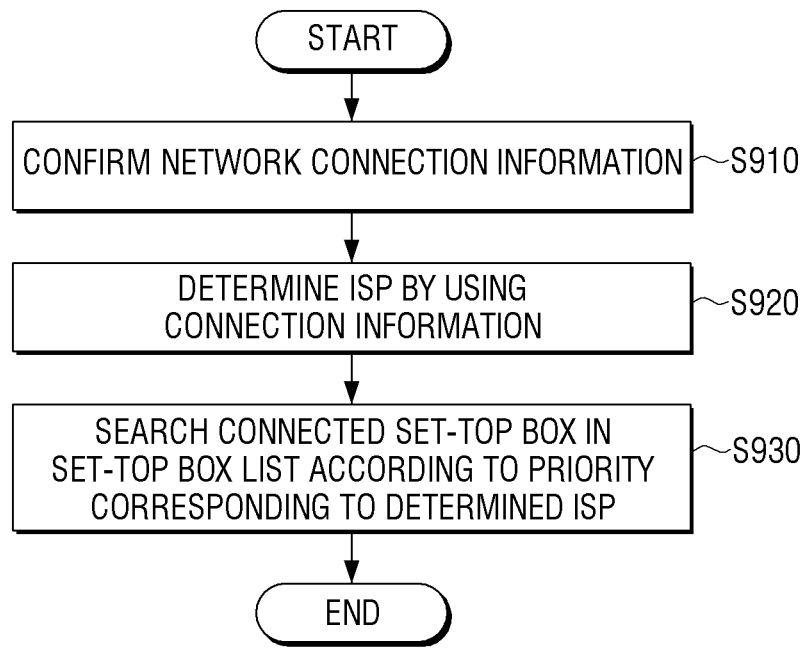
FIGS. 9 through 12 are flow charts provided to explain a method of identifying a set-top box of the display apparatus according to an exemplary embodiment.

FIG. 9 is a flow chart provided to explain a method of identifying the set-top box 200 of the display apparatus 100 according to an exemplary embodiment. Referring to FIG. 9, the display apparatus 100 may confirm network connection information at operation S910. For example, the network connection information may be one of the IP address of the DNS server, the IP address of the router, the IP address assigned to the display apparatus 100, and the SSID of the wireless network signal retrieved in the display apparatus 100.

In addition, the display apparatus 100 may determine an Internet service provider at operation S920 by using the confirmed network connection information. The display apparatus 100 may determine which set-top box model is the set-top box 200 connected to the display apparatus 100 in the set-top box list stored according to a priority corresponding to the determined Internet service provider at operation S930. The detailed operation thereof will be introduced with reference to FIGS. 10 and 11 below.

Figure 10:
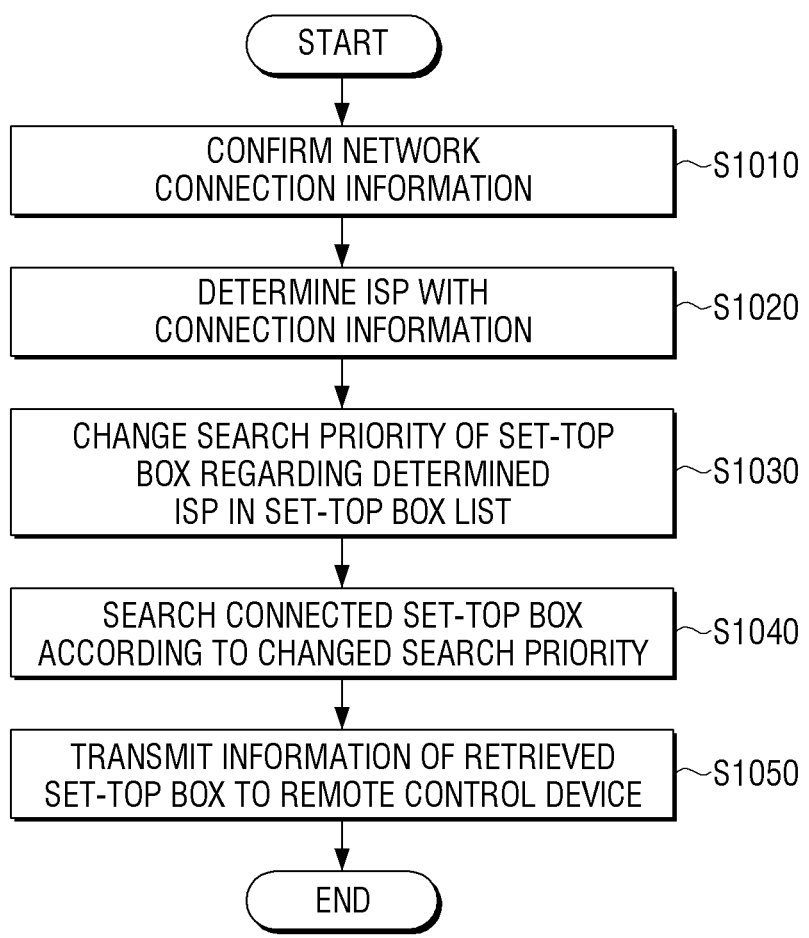

FIG. 10 is a flow chart provided to explain a method of identifying the set-top box 200 of the display apparatus 100 according to an exemplary embodiment. The detailed description of operation S1010 of FIG. 10 will be omitted as corresponding to operation S910.

The display apparatus 100 may determine an Inter service provider (ISP) by using the confirmed network information at operation S1020. For example, the display apparatus 100 may identify the IP address of the DNS server of the connected network. In addition, the display apparatus 100 may determine an Internet service provider based on the identified IP address of the DNS server. Internet service providers each may have their own DNS servers. In addition, IP addresses of the primary and secondary DNS servers of the major Internet service providers are known to the public.

As another example, the display apparatus 100 may identify the IP address of the router of the connected network. In addition, the display apparatus 100 may determine the area where the display apparatus 100 is located based on the identified IP address of the router. The internet service provider mainly used in the area may be identified by using area information, and thus the display apparatus 100 may determine which company is the Internet service provider based on the determined area.

According to another example, the display apparatus 100 may identify an IP address of the display apparatus 100 connected to the network. In the same way to determine an Internet service provider based on the IP address of the router, the display apparatus 100 may determine the area where the display apparatus 100 is located based on the IP address of the display apparatus 100, and determine an Internet service provider based on the determined area.

By using Internet service provider information determined according to the various exemplary embodiments, the display apparatus 100 may change the search priority of the set-top box regarding the Internet service provider determined in the stored set-top box list at operation S1030. In addition, the display apparatus 100 may sequentially search the set-top box 200 connected to the display apparatus 100 in the set-top box list according to the changed search priority at operation S1040. When identifying which model is the set-top box 200 connected to the display apparatus 100, the display apparatus 100 may transmit information of the retrieved set-top box to the remote control device 300 at operation S1050. For example, the display apparatus 100 may transmit the model name, control code, specification information of the retrieved set-top box to the remote control device 300.

Figure 11:
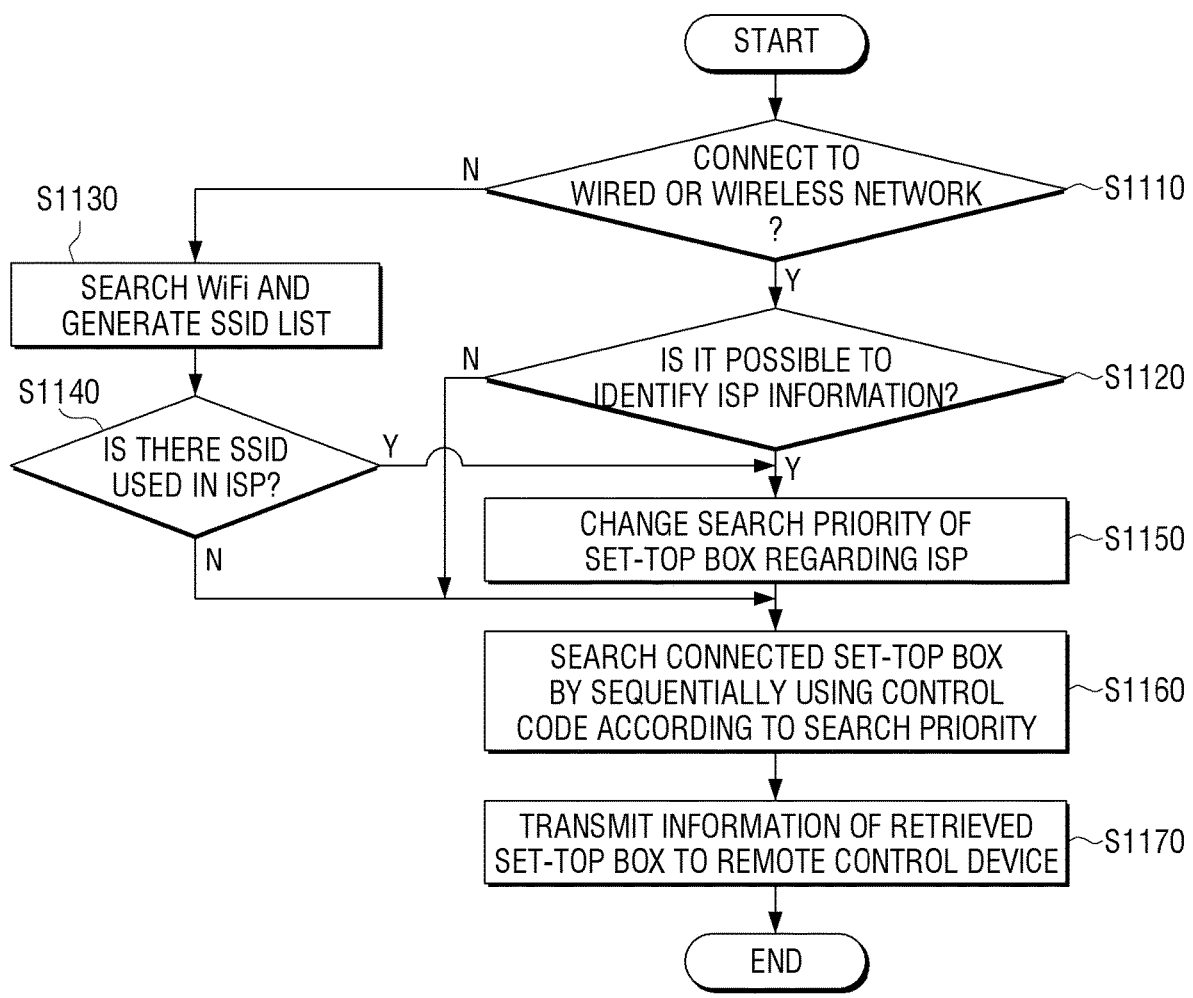

FIG. 11 is a flow chart provided to explain a method of identifying the set-top box 200 of the display apparatus 100 according to an exemplary embodiment. Whether the display apparatus 100 is connected to the wired or wireless network may be identified at operation S1110. When the display apparatus 100 is connected to the network at operation S1110-Y, the display apparatus 100 may identify the information of the Internet service provider (ISP) at operation S1120. When the Internet service provider information is identified at operation S1120-Y, the display apparatus 100 may change the search priority of the set-top box regarding the Internet service provider in the stored set-top box list at operation S1150.

When the display apparatus 100 is not connected to the network at operation S1110-N, the display apparatus 100 may search a wireless network signal (e.g., a WiFi signal) in neighbor. In addition, the display apparatus 100 may generate an SSID list of the retrieved wireless network signal at operation S1130. The display apparatus 100 may determine whether the SSID typically used by the Internet service provider is included in the generated SSID list at operation S1140. When there is a matching SSID at operation S1140-Y, the display apparatus 100 may change the search priority of the set-top box regarding the Internet service provider in the stored set-top box list at operation S1150.

When the Internet service provider is not determined, for example at operations S1120-N and S1140-N, the display apparatus 100 may proceed to retrieve a set-top box without changing the search priority for the stored set-top box list.

The following operations S1160 and S1170 may include identifying a set-top box by transmitting a control code to the connected set-top box according to a predetermined search priority, and transmitting information of the identified set-top box to the remote control device 300. The detailed description thereof will be omitted.

Figure 12:
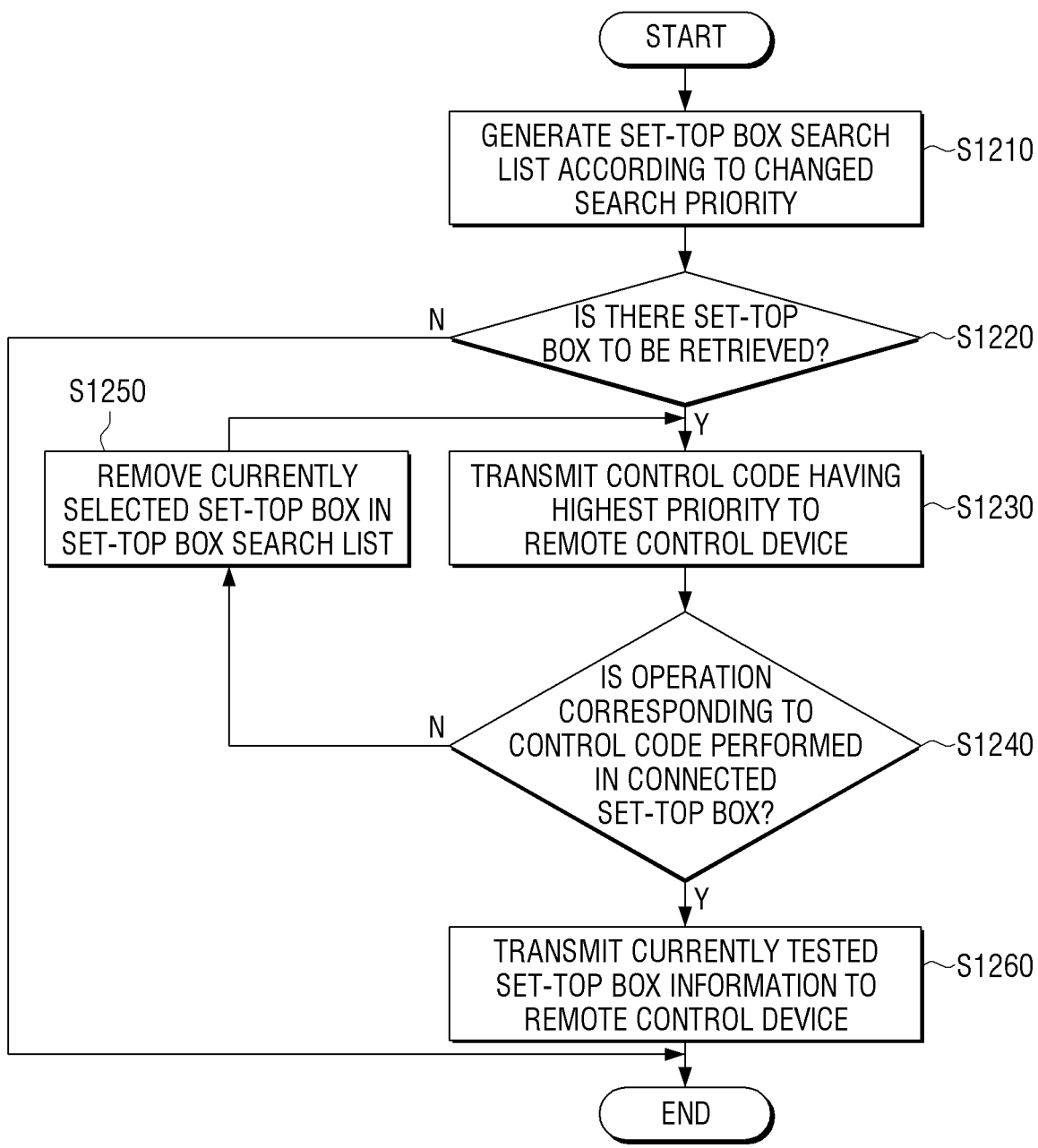

FIG. 12 is a flow chart provided to explain a search operation of a set-top box after a search priority of a set-top box search list is changed according to an exemplary embodiment. The display apparatus 100 may generate the set-top box search list according to the changed search priority at operation S1210.

When there is a set-top box to be retrieved at operation S1220-Y, the display apparatus 100 may transmit the control code of the set-top box having the highest priority in the changed set-top box list to the remote control device 300 at operation S1230. Upon receipt of the control code, the remote control device 300 may transmit the control code to the set-top box 200. In another exemplary embodiment, the display apparatus 100 may transmit the control code to the set-top box 200 without the remote control device 300.

The display apparatus 100 may determine whether the connected set-top box performs an operation corresponding to the control code at operation S1240. For example, when a control code corresponding to a volume up is transmitted, the display apparatus 100 may sense whether the set-top box 200 performs an operation to raise a volume.

When the operation corresponding to the control code is not performed at operation S1240-N, the display apparatus 100 may remove the currently selected set-top box in the set-top box search list at operation S1250. In addition, the display apparatus 100 may continue to perform an operation of transmitting the control code of the set-top box corresponding to a subsequent priority to the remote control device 300.

On the contrary, when the operation corresponding to the control code is performed at operation S1240-Y, the display apparatus 100 may transmit information of the currently tested set-top box to the remote control device 300 at operation S1260.

According to the various exemplary embodiments, the display apparatus 100 may efficiently reduce a search time required for automatically identifying the set-top box 200 connected to the display apparatus 100 in a process of setting an integrated remote function of the remote control device 300.

The above-described methods may be implemented in the form of program command which are performed through various computers, and may be recorded on a computer-readable medium. The computer readable medium may include program commands, data files, and data structures either alone or in combination. The program commands recorded in the computer-readable recording medium may be especially designed and constituted for the present disclosure or be known to those skilled in a field of computer software. Examples of the computer-readable medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that can be executed by a computer by using an interpreter. The hardware device may be configured to operate as one or more software modules to perform the operation of the present disclosure, and the reverse can be applied.

The foregoing exemplary embodiments are merely exemplary and are not to be construed as limiting the present inventive concept. Accordingly, the scope of the present disclosure is not construed as being limited to the described exemplary embodiments, but is defined by the appended claims as well as equivalents thereto.

What is claimed is:

1. A method of identifying a set-top box connected to a display apparatus of the display apparatus, the method comprising:

establishing, by the display apparatus, a network connection between the display apparatus and a network;

obtaining, by the display apparatus, network connection information corresponding to the established network connection;

identifying, by the display apparatus, an internet service provider based on the obtained network connection information;

rearranging, by the display apparatus, a set-top box search list by changing an order of set-top boxes corresponding to the identified internet service provider to assign a highest search priority to a set-top box corresponding to the identified internet service provider;

transmitting by the display apparatus, a control signal for controlling the set-top box of the highest search priority to the connected set-top box; and based on identifying that the connected set-top box performs an operation based on the transmitted control signal, identifying, by the display apparatus, the connected set-top box the set-top box of the highest search priority.

2. The method as claimed in claim 1, wherein the identifying of the connected set-top box comprises:

rearranging the set-top box search list which includes a plurality of control codes corresponding to a plurality of set-top boxes according to the priority corresponding to the identified internet service provider, wherein the plurality of control codes respectively corresponds to a plurality of control signals for controlling the plurality of set-top boxes included in the set-top box search list.

3. The method as claimed in claim 1, wherein the transmitting the control signal further comprises transmitting information of the set-top box of the highest search priority to a remote control device, and wherein the remote control device transmits the control signal to the connected set-top box based on the information of the set-top box of the highest search priority.

4. The method as claimed in claim 3, wherein the information of the identified set-top box comprises at least one of a set-top box model name and a control code.

5. The method as claimed in claim 1, wherein the identifying of the internet service provider comprises:

based on the display apparatus being connected to a network, identifying an Internet Protocol (IP) address of a Domain Name System (DNS) server of the connected network; and identifying the internet service provider based on the identified IP address of the DNS server.

6. The method as claimed in claim 1, wherein the identifying of the internet service provider comprises:

based on the display apparatus being connected to a network, identifying an Internet Protocol (IP) address of a router of the connected network;

identifying an area where the display apparatus is located based on the identified IP address of the router; and identifying the internet service provider based on the identified area.

7. The method as claimed in claim 1, wherein the identifying of the internet service provider comprises:

based on the display apparatus being connected to a network, identifying an Internet Protocol (IP) address of the display apparatus connected to the network;

identifying an area where the display apparatus is located based on the identified IP address of the display apparatus; and identifying the internet service provider based on the identified area.

8. The method as claimed in claim 1, wherein the identifying of the internet service provider comprises:

based on the display apparatus not being connected to a network, searching a neighboring wireless network signal; and identifying the internet service provider based on a service set identifier (SSID) of the neighboring wireless network signal.

9. The method as claimed in claim 8, wherein the identifying of the internet service provider based on the SSID comprises determining whether the SSID is used by the internet service provider.

10. The method of claim 1, wherein the rearranging further comprises:

identifying one or more entries in the set-top box search list corresponding to the identified internet service provider; and moving the one or more entries corresponding to the identified internet service provider to a beginning of the set-top box search list.

11. A display apparatus, comprising:

a communicator configured to connect the display apparatus to a network;

a memory storing a set-top box search list including set-top box information; and a processor configured to:

obtain network connection information corresponding to network connect between the display apparatus and the network, identify an internet service provider based on the obtained network connection information, rearrange the set-top box search list by changing an order of set-top boxes corresponding to the identified internet service provider to assign a highest search priority to a set-top box corresponding to the identified internet service provider, transmit a control signal for controlling the set-top box of the highest search priority to the connected set-top box, and based on identifying that the connected set-top box performs an operation based on the transmitted control signal, identify the connected set-top box as the set-top box of the highest search priority.

12. The display apparatus as claimed in claim 11, wherein the processor is further configured to rearrange the set-top box search list which includes a plurality of control codes corresponding to a plurality of set-top boxes according to the priority corresponding to the identified internet service provider, wherein the plurality of control codes respectively corresponds to a plurality of control signals for controlling the plurality of set-top boxes included in the set-top box search list.

13. The display apparatus as claimed in claim 11, wherein, in the transmitting the control signal, the processor is configured to control the communicator to transmit information of the set-top box of the highest search priority to a remote control device, and wherein the remote control device transmits the control signal to the connected set-top box based on the information of the set-top box of the highest search priority.

14. The display apparatus as claimed in claim 13, wherein the information of the identified set-top box comprises at least one of a set-top box model name and a control code.

15. The display apparatus as claimed in claim 11, wherein the processor, based on the display apparatus being connected to the network, is further configured to identify an Internet Protocol (IP) address of a Domain Name System (DNS) server of the connected network and determine the internet service provider based on the identified IP address of the DNS server.

16. The display apparatus as claimed in claim 11, wherein the processor, based on the display apparatus being connected to the network, is further configured to identify an Internet Protocol (IP) address of a router of the connected network, identify an area where the display apparatus is located based on the identified IP address of the router, and identify the internet service provider based on the identified area.

17. The display apparatus as claimed in claim 11, wherein the processor, based on the display apparatus being connected to the network, is further configured to identify an Internet Protocol (IP) address of the display apparatus connected to the network, identify an area where the display apparatus is located based on the identified IP address of the display apparatus, and identify the internet service provider based on the identified area.

18. The display apparatus as claimed in claim 11, wherein the processor, based on the display apparatus not being connected to the network, is further configured to search a neighboring wireless network signal and determine the internet service provider based on a service set identifier (SSID) of the wireless network signal.

19. The display apparatus as claimed in claim 18, wherein the processor is further configured to identify the internet service provider based on whether the SSID is used by the internet service provider.

20. A method of identifying a set-top box connected to a display apparatus of the display apparatus, the method comprising:
    establishing a network connection between the display apparatus and a network;
    obtaining network connection information corresponding to the established network connection;
    identifying an internet service provider based on the obtained network connection information; and
    identifying the connected set-top box by using a set-top box search list which is prioritized according to the identified internet service provider,
    wherein the identifying of the connected set-top box further comprises:
        transmitting a control code corresponding to a set-top box of the set-top box search list to a remote control device; and
        based on the connected set-top box performing an operation corresponding to the control code, identifying the connected set-top box as the set-top box.

* * * * *